July 1, 1958 W. W. SCHULTZ 2,841,715
RADIATION DETECTION DEVICE
Filed Oct. 2, 1953
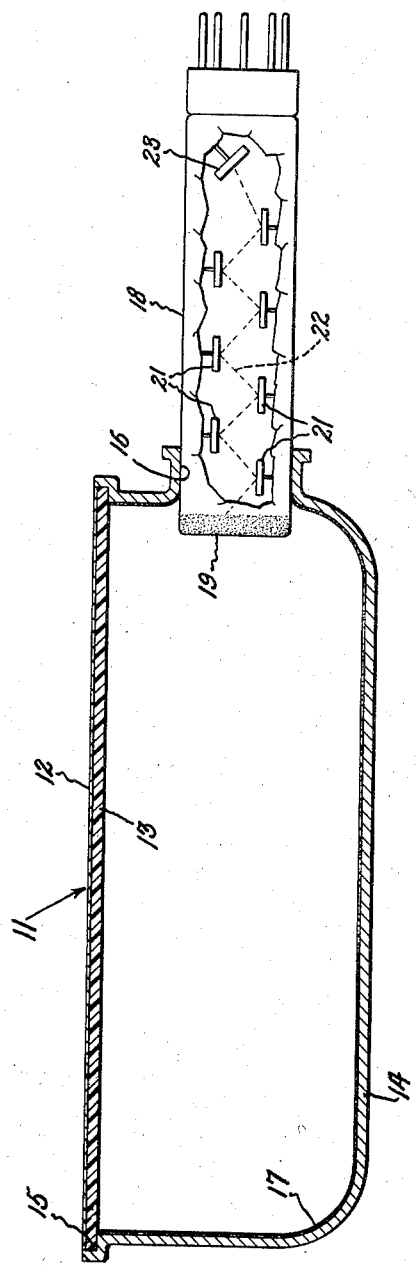
Inventor:
Warner W. Schultz,
by Charles W Helzer
His Attorney.

United States Patent Office 2,841,715
Patented July 1, 1958

2,841,715

RADIATION DETECTION DEVICE

Warner W. Schultz, Schenectady, N. Y., assignor to General Electric Company, a corporation of New York Application October 2, 1953, Serial No. 383,732

2 Claims. (Cl. 250—71)

The present invention relates to a radiation detection device.

More specifically, the invention relates to a radiation detection device of the scintillation type for detecting and measuring radioactivity.

Scintillation type radiation detection devices are available commercially at the present time, however, the number and kind of applications in which such detection devices can be used has been restricted somewhat due to certain limitations inherent in their design. In particular, presently known scintillation type radiation detectors are not sufficiently sensitive to lower energy radiations from radioactive materials, and are not conveniently used to monitor relatively wide areas for radioactivity.

It is therefore one object of the present invention to provide an improved radioactive radiation detection device of the scintillation type which responds to lower energy penetrative radiations.

Another object of the invention is to provide a scintillation type radiation detection device which can be used to monitor wide areas of an object for radioactive contamination in relatively short periods of time.

A feature of the invention is the provision of a detection device which includes a radiation sensitive fluorescent means for converting the energy in a beam of penetrative radiations from wide areas of radioactive materials into light flashes having an intensity representative of the energy of the penetrative radiations. A single photoelectric device having a photosensitive element whose area is small compared to the area of the radiation sensitive fluorescent means is associated therewith for converting the light flashes into an electric current representative of the number and intensity of such light flashes, and a light integrating means is interposed between the radiation sensitive fluorescent means and the photosensitive means for collecting and integrating the light flashes and directing the same to the photosensitive element of the photoelectric device means.

Other objects, features and many of the intended advantages of this invention will be appreciated more readily as the same become better understood by reference to the following detailed description when considered in connection with the accompanying drawing, wherein:

Fig. 1, the only figure in the drawing, is a cross-sectional view of a scintillation type radiation detection device constructed in accordance with the present invention.

A radiation detection device constructed in accordance with the invention is shown in Fig. 1. The device includes a radiation sensitive fluorescent means 11 which is formed by coating a radiation sensitive fluorescent covering 12, such as zinc sulfide, over a translucent or transparent member 13. The light transmitting member 13 may comprise nothing more than a screen for supporting the coating of zinc sulfide 12, if it is desired that the device be used to detect and measure radiations of a particular type. In the specific example cited, the zinc sulfide coating 12 will respond only to alpha particles, hence, the device could be used for detecting only that type of radiation. However, should it be desired to detect other types of radiation as well as alpha particles, the transparent member 13 may be constructed of a plastic scintillation phosphor such as those described on pages 446 and 447 of the August 1952 issue of the Review of Scientific Instruments, volume 23, No. 8. These plastic scintillation phosphors can be made to respond to either beta or gamma rays, and can be used with or without the coating 12 of zinc sulfide. If, however, the coating 12 of zinc sulfide is used in conjunction with one of the plastic scintillation phosphors, the resulting fluorescent member will respond to all types of penetrating radiations that is alpha particles as well as beta and gamma rays, and hence can be used as a general radiation detection instrument.

The radiation sensitive fluorescent member 11 formed by translucent member 13 and coating 12 is mounted on a light integrating means for collecting and integrating light flashes produced by the fluorescent member. This light integrating means comprises an integrating box formed by a housing member 14 having a first opening 15 in which the fluorescent member 11 is disposed with coating 12 on its external surface and a second opening 16 in which a photosensitive means is disposed. A highly reflective or diffusing coating 17 is formed over the entire inner surface of the housing member 14, and preferably comprises a white magnesium carbonate paint. This highly reflective coating forms a light reflective surface which acts upon the light flashes produced by the radiation sensitive fluorescent member 11 to integrate or collect such light flashes and direct the same toward the opening 16.

Disposed in the opening 16 is a photosensitive means which preferably comprises a photoelectric device 18 of the photomultiplier type. One specific photoelectric device which is suitable for use is a Radio Corporation of America type 5819 photomultiplier tube described in Luminescence and the Scintillation Counter by S. C. Curran, F. R. S., Butterworth's Scientific Publications, London 1953, pages 2–4. This photoelectric device includes a photosensitive element or cathode surface 19 which produces electrons upon light impinging thereon. The electrons produced by the photosensitive cathode surface 19 are directed along a path, illustrated by the dotted line 22, where they successively impinge upon a plurality of serially aligned photo anodes 21 which operate to amplify or magnify the electrons emitted by surface 19. The amplified electron beam is collected on a final collecting anode 23 which is connected in electrical circuit relationship with an output indicating circuit, not shown, that serves to produce an indication of the magnitude of the penetrative radiation reaching the radiation sensitive fluorescent member 11. One satisfactory output indicating circuit arrangement is described in an article appearing on pages 935–939 of the October 1952 issue of Electrical Engineering.

In operation, the radiation detection device shown in Fig. 1 is brought adjacent an object or an area to be monitored for radioactive contamination. As an example, suppose the device is to be used to monitor the hands of workers in a plant processing radioactive materials. The hand of an individual worker is placed adjacent the radiation sensitive fluorescent member 11 so that any radioactive radiations emanating from the hand cause the fluorescent member 11 to fluoresce thus giving off flashes of light having an intensity proportional to the amount of radiation emanating from the hand. These light flashes are collected and integrated by the light integrating box arrangement formed by the housing 14 and the light reflective coating 17. Light flashes thus collected are directed to the photosensitive cathode 19 of the photoelectric device 18. Upon impingement of the light flashes on the photosensitive cathode 19 an electron beam is produced in the photoelectric device which has a magnitude proportional to the intensity of the radioactive radiations impinging upon the fluorescent member 11. Hence, an output signal provided by the output indicating circuit connected to the collecting electrode 23 of the photoelectric device provides an indication of the amount of radioactive contamination on the hand of the individual worker being monitored. By reason of the collecting and integrating action of the housing member 14 and the highly reflective coating 17, it can be appreciated that lower energy radiations emanating from the hand and producing very low intensity light flashes in the fluorescent member 11, are caused to produce an effect on the photosensitive cathode 19, and hence in the output indication of the instrument connected to the photoelectric device 18. Hence, the instrument is made much more sensitive to lower energy penetrative radiations, and provides a more accurate indication of the total radioactive contamination of the object being monitored. In addition, it can be appreciated that if it is desired to use a radiation detection device shown in Fig. 1 to monitor other portions of the body of a human being than the hand, it will be desirable that the area of the fluorescent member 11 be increased so as to facilitate such examination. For example, should it be desired to monitor the chest or back of a worker in a plant handling radioactive materials rather than the hand, to use an instrument suitable for examining the hand would require that the several measurements be taken in order to cover the entire area to be monitored. It is much more desirable that the size or area of the fluorescent member 11 be increased commensurate with the object to be monitored so that only one reading will be required. By reason of the provision of the integrating box formed by the housing member 14 and the highly reflective coating 17, this can readily be done, since, in the event that light flashes or fluorescence occurs in a remote portion of the fluorescent member 11 away from the photosensitive surface 19, such light flashes will be collected and integrated in with other more prominent light flashes, and will produce an effect in the output indication circuit connected to collecting electrode 23. It can therefore be appreciated that the invention provides an improved radiation detection device of the scintillation type which responds to lower energy penetrative radiations than previous devices of the same type, and which can readily be modified for use in monitoring wide areas of objects suspected of radioactive contaminations.

Obviously, other modifications and variations of the present invention are possible in light of the above teachings. It is therefore to be understood that changes may be made herein which are within the full intended scope of the invention as defined by the appended claims.

What I claim as new and desire to secure by Letters Patent of the United States is:

1. A scintillation type radiation detection device comprising a fluorescent member having an area which is sufficient in extent to cover a wide surface area of an object to be monitored and which gives off light flashes throughout said area having an intensity proportional to the amount of radiant energy received from said object, a single photoelectric device having a photosensitive element which is smaller in area than said area of said fluorescent member and which produces electrons when light impinges thereon, and a housing member having therein a first opening in which said fluorescent member is disposed and a second opening therein remotely located relative to portions of said fluorescent member in said first opening and in which said photosensitive member of said photoelectric device is disposed, said housing member having a light reflective surface on its entire inner area which connects said openings, whereby said device provides in relatively short periods of time a single accurate indication of the total radioactive contamination of said wide surface area of said object being monitored.

2. A scintillation type radiation detection device comprising a light transmitting member having a surface area which is sufficient in extent to cover a wide surface area of an object to be monitored, a coating of zinc sulfide on said surface area of said light transmitting member, a single photoelectric device having a photosensitive element which is smaller in area than said zinc sulfide coated surface area of said light transmitting member and which produces electrons when light impinges thereon, a housing member having therein a first opening in which said light transmitting member is disposed with its said zinc sulfide coated surface area on its exterior surface and a second opening therein remotely located relative to portions of said zinc sulfide coated member in said first opening and in which said photosensitive member of said photoelectric device is disposed, said housing member having a light reflecting coating of white magnesium carbonate on its entire inner surface which connects said openings whereby said device provides in relatively short periods of time a single accurate indication of the total radioactive contamination of said wide surface area of said object being monitored.

References Cited in the file of this patent
UNITED STATES PATENTS

| | | |
|---|---|---|
| 2,549,574 | Condiff | Apr. 17, 1951 |
| 2,550,107 | Coltman | Apr. 24, 1951 |
| 2,575,769 | Rajchman et al. | Nov. 20, 1951 |
| 2,681,416 | Thompson | June 15, 1954 |
| 2,739,242 | Armistead | Mar. 20, 1956 |